UNITED STATES PATENT OFFICE.

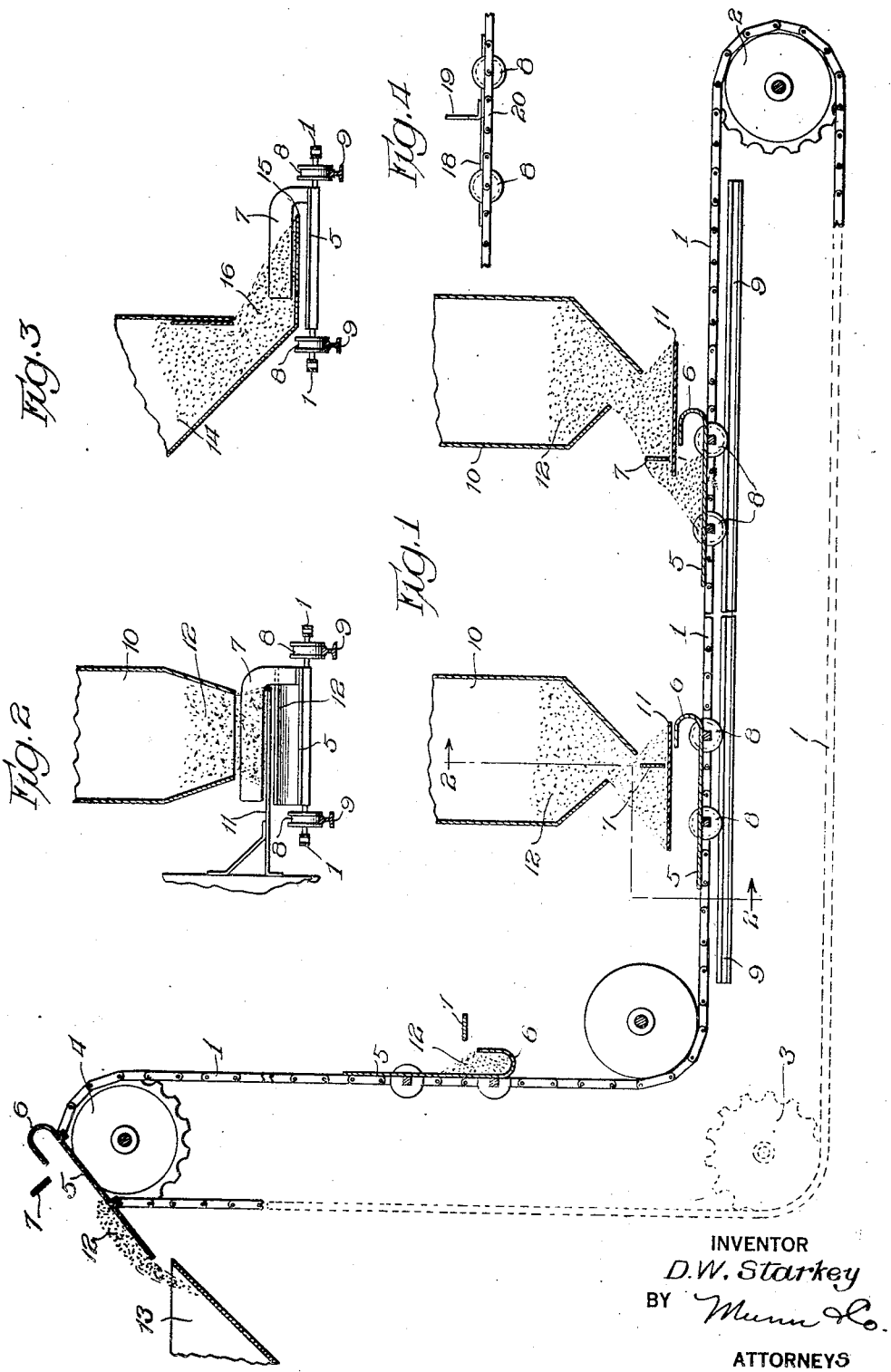

DAVID W. STARKEY, OF CHICAGO, ILLINOIS.

CONVEYER.

1,355,180.  Specification of Letters Patent.  Patented Oct. 12, 1920.

Application filed November 17, 1919. Serial No. 338,715.

*To all whom it may concern:*

Be it known that I, DAVID W. STARKEY, a citizen of the United States, and a resident of the city of Chicago, in the county of Cook and State of Illinois, have invented a new and useful Improvement in Conveyers, of which the following is a full, clear, and exact description.

My invention relates to improvements in conveyers, and it consists in the combinations, constructions and arrangements herein described and claimed.

An object of my invention is to provide a conveying device which may be run economically, due to the fact that one or more buckets or carriers may be provided, depending upon the quantity of material to be conveyed.

A further object of my invention is to provide a conveyer having means for removing material from a pile periodically as the conveyer passes the pile.

A further object of my invention is to provide an improved form of conveyer in which the material is positively forced onto the carrier by the movement of the conveyer, the carrier being provided with wheels which are outside of the range of the material, so that where such articles as ashes are to be conveyed, the carrier may be provided with ball bearings without any interference from the material conveyed.

Other objects and advantages will appear in the following specification, and the novel features of the invention will be particularly pointed out in the appended claims.

My invention is illustrated in the accompanying drawings, forming part of this application, in which Figure 1 is a view in section showing the general arrangement of the conveyer, Fig. 2 is a section along the line 2—2 of Fig. 1, Fig. 3 is a sectional view through a modified form of the device, and Fig. 4 is a side view of a modified form of carrier.

In carrying out my invention, I provide an endless belt 1 which, in this instance, consists of a pair of parallel chains running over the sprockets 2, 3 and 4, driven in any suitable manner. The carrier is formed of a flat plate 5 which is preferably curved upwardly and forwardly, as shown at 6, so that when the carrier is moved vertically, the curved portion forms a pocket in which the material will be safely carried. Each plate 5 is provided with an L-shaped scraper 7, which is secured at one end of the plate and is bent laterally over the plate, as shown in Figs. 2 and 3. Each carrier plate is preferably provided with rollers 8 which are mounted on tracks 9. These rollers may have ball bearings, if desired.

In Figs. 1 and 2, I have shown hoppers 10, beneath which is a platform 11 supported in any suitable manner, but spaced from the end of the hopper. The material 12 passes out of the lower end of the hopper onto the platform 11. The scraper 7 is arranged to pass just above the platform 11 through the material 12, so as to scrape the material off onto the plate 5 during the passage of the carrier. At the left of Fig. 1 is shown a portion of the conveying mechanism which elevates the material, the latter being collected at the curved end of the carrier, and being deposited into the chute 13 as the carrier rounds the upper socket wheel.

In Fig. 3, I have shown a modified form of the device, in which the hopper 14 has a bottom 15 which extends laterally so as to hold the material 16 thereon. The scraper 7, in this instance, passes through only a portion of the material, and not all of it, as in Fig. 1.

The device described above is especially adapted for conveying material, such as ashes, which would ordinarily tend to clog up the wheels of conveyers. The great difficulty in conveying ashes is to get a conveyer whose wheels will not be clogged up by the dust of the ashes. In the present instance, the wheels may be provided with ball bearings, and run on the tracks 9 without any intereference from the material being conveyed. The scraper positively removes the material so that there is no danger of the clogging of the hopper, as in those conveyers in which the movement of the material from the hopper to the carrier is conveyed entirely by gravity.

In Fig. 4, I have shown a modified form in which the carrier plate 18 is flat, not curved, at its rear end. It is provided with a scraper 19 of the type already described, and is carried along by an endless carrier 20. This type of the device is designed primarily for conveying material horizontally, while that shown in Fig. 1 may convey it horizontally or vertically.

The device is simple in construction, has few parts, is positive in action, and is relatively cheap to build.

I claim:

1. In a conveying system, a hopper for holding material, a platform for receiving material carried by the hopper, an endless belt, a carrier secured to said endless belt and having a plate arranged to receive the material, and a scraper carried by the plate and arranged to engage the material on the platform for scraping the material onto the plate during the movement of the latter.

2. In a conveying system, a hopper for holding material, a platform for receiving material carried by the hopper, an endless belt, a carrier secured to said endless belt and having a plate arranged to receive the material, said plate being arranged to run underneath the platform, and an L-shaped scraper secured at one end to said plate, a portion of the scraper being arranged to pass above the platform and to engage the material thereon, and to push the material off from the platform onto the plate.

3. In a conveying system, a hopper for holding material, said hopper having an opening for the discharge of the material near its lower end, a horizontal platform for receiving the material, an endless belt, a carrier comprising a flat plate, a track disposed beneath said platform, wheels carried by the carrier and arranged to run on said track, and a scraper secured at one end to said carrier and arranged to extend above the platform as the carrier is drawn along by the endless belt, whereby material, deposited on the platform, is scraped off onto the carrier.

4. In a conveying system, an endless belt, a carrier comprising a flat plate having its rear end bent upwardly and forwardly, wheels carried by the carrier, a track arranged to run underneath said belt, and an L-shaped scraper secured at one end to said carrier, a portion of the scraper being arranged to extend laterally over the body of the carrier.

DAVID W. STARKEY.